(12) United States Patent
Nuzman et al.

(10) Patent No.: US 10,069,534 B2
(45) Date of Patent: Sep. 4, 2018

(54) METHODS AND SYSTEMS FOR LOAD BALANCING IN VECTORING

(71) Applicants: Carl J. Nuzman, Union, NJ (US); Frank Defoort, Kruibeke (BE); Carl Mertens, Brasschaat (BE); Koenraad Schelfhout, Zwijndrecht (BE)

(72) Inventors: Carl J. Nuzman, Union, NJ (US); Frank Defoort, Kruibeke (BE); Carl Mertens, Brasschaat (BE); Koenraad Schelfhout, Zwijndrecht (BE)

(73) Assignees: ALCATEL LUCENT, Boulogne-Billancourt (FR); NOKIA OF AMERICA CORPORATION, Murray Hill, NJ (US)

( * ) Notice: Subject to any disclaimer, the term of this patent is extended or adjusted under 35 U.S.C. 154(b) by 0 days.

(21) Appl. No.: 15/371,824

(22) Filed: Dec. 7, 2016

(65) Prior Publication Data
US 2018/0159589 A1 Jun. 7, 2018

(51) Int. Cl.
*H04B 3/32* (2006.01)
*H04L 12/28* (2006.01)

(52) U.S. Cl.
CPC .......... *H04B 3/32* (2013.01); *H04L 12/2869* (2013.01)

(58) Field of Classification Search
CPC . H04B 3/32; H04J 3/10; H04M 11/06; H04M 11/062; H04M 11/066; H04L 12/2869

USPC .......................................... 370/201; 379/417
See application file for complete search history.

(56) References Cited

U.S. PATENT DOCUMENTS

| | | | |
|---|---|---|---|
| 8,514,687 B2* | 8/2013 | Chow | H04B 3/32 370/201 |
| 9,065,534 B2* | 6/2015 | Shridhar | H04B 3/32 |
| 9,088,350 B2* | 7/2015 | Pereira | H04B 17/00 |
| 2012/0020418 A1* | 1/2012 | Sands | H04B 3/32 375/259 |

OTHER PUBLICATIONS

"Self-FEXT cancellation (vectoring) for use with VDSL2 transceivers," Series G: Transmission Systems and Media, Digital Systems and Networks, ITU G.993.5, Apr. 2010.

\* cited by examiner

*Primary Examiner* — Betsy Deppe
(74) *Attorney, Agent, or Firm* — Harness, Dickey & Pierce, P.L.C.

(57) ABSTRACT

In one example embodiment, a system including a plurality of ports, a plurality of vectoring processors, each of the plurality of vectoring processors having a coefficient memory storing vectoring coefficients corresponding to different victim line and disturber line combinations of a plurality of communication paths connected to the plurality of ports, at least one victim line associated with two of the plurality of vectoring processors and a controller, the controller being configured to assign the victim line and disturber line combinations to the memories based on loads associated with the vectoring coefficients.

20 Claims, 5 Drawing Sheets

METHODS AND SYSTEMS FOR LOAD BALANCING IN VECTORING

BACKGROUND

Performance of a digital subscriber line (DSL) in terms of capacity depends on a number of factors such as attenuation and a noise environment. Performance of a DSL transmission system is impacted by crosstalk interference from one twisted line pair to another twisted line pair with the same binder and, to a lesser extent, twisted line pairs in neighboring binders.

Consequently, crosstalk interference may affect data rates across a number of twisted pair lines.

For instance two communication lines such as two very-high-bitrate digital subscriber line (VDSL2) lines which are collocated next to each other induce a signal in each other. Due to the induced crosstalk and noise from other sources in the surroundings of the communication line, the data transported on these lines may be affected or corrupted by the crosstalk and noise. By reducing the crosstalk induced on a communication line or compensating the crosstalk induced on a communication line, the amount of corrupted data may be reduced and the rate at which information can be reliably communicated is increased.

Existing solutions for reducing crosstalk and noise include vectoring. Vectoring refers to precoding (downstream) or postcoding (upstream) to cancel crosstalk between multiple twisted pair copper lines in a DSL access node.

Precoding (also referred to as precompensation) techniques are based on transmitting an additional signal added to the data signal which is used to compensate for the crosstalk on a victim line from external sources. Thus, instead of reducing the effect of crosstalk or avoiding crosstalk effects by configuring the communication line in an appropriate way, precoding can be used to compensate for the effects of crosstalk on a communication channel. Precoding techniques are based on crosstalk channel information that includes both amplitude and phase information. Such information can be obtained from measurements such as slicer error or signal-to-noise ratio (SNR). A particular example of such measurements for precoding is the use of pilot sequences and error feedback. The use of pilot sequences in G.vector is described in "Self-FEXT cancellation (vectoring) for use with VDSL2 transceivers," *Series G: Transmission Systems and Media, Digital Systems and Networks, ITU G.993.5*, April 2010, the entire contents of which is incorporated by reference.

In the context of providing data network access to homes and businesses, various technologies collectively known as FTTx have been used or proposed. In these technologies, data is conveyed from a network operator to an intermediate location using fiber optics, and data is conveyed from the intermediate location to the customer location using DSL transmission over twisted pair copper lines. The term FTTdp refers to a scenario in which the intermediate location is a "distribution point", serving up to a few dozen customers within a distance of less than 200 m. For example, G.fast is a transmission technology that uses time division duplexing (TDD) to duplex downstream and upstream transmission.

SUMMARY

Example embodiments are directed to methods and systems for load balancing in a vectoring system.

Example embodiments disclose balancing loads across vectoring processors in a vectoring system.

According to one example embodiment, a system includes a plurality of ports, a plurality of vectoring processors, each of the plurality of vectoring processors having a coefficient memory storing vectoring coefficients corresponding to different victim line and disturber line combinations of a plurality of communication paths connected to the plurality of ports, at least one victim line associated with two of the plurality of vectoring processors and a controller, the controller being configured to assign the victim line and disturber line combinations to the memories based on loads associated with the vectoring coefficients.

According to an example embodiment, each of the plurality of vectoring processors includes a subset table configured to identify assigned disturbers of a selected victim line and a subset selector configured to select data corresponding to the assigned disturber lines and the selected victim line, the vectoring processor configured to process the selected data in accordance with the stored vectoring coefficients.

According to an example embodiment, the controller is configured to reduce an imbalance of the loads by reassigning a selected victim line and disturber line combination assigned to a selected vectoring processor to another vectoring processor of the plurality of vectoring processors based on the loads.

According to an example embodiment, the controller is configured to select a victim line of the plurality of communication paths, determine disturber lines of the selected victim line, obtain first vectoring coefficients associated with the selected victim line and the determined disturber lines, the first vectoring coefficients being a portion of the vectoring coefficients corresponding to the selected victim line and determined disturber line combinations of the plurality of communication paths and first assign the determined disturber lines of the selected victim line to one of the plurality of vectoring processors based on the first vectoring coefficients.

According to an example embodiment, the controller is configured to reassign at least one of the determined disturber lines of the selected victim line to another of the plurality of vectoring processors based on a total load of the first assigned vectoring processor.

According to an example embodiment, the first vectoring coefficients are associated with first loads, respectively, the first loads being a portion of the loads associated with the vectoring coefficients and the total load is a sum of the first loads.

According to an example embodiment, the total load corresponds to a number of bits, the number of bits being the number of bits used to represent a list of the first vectoring coefficients when stored in the memory of the first assigned vectoring processor, the list indicating the first vectoring coefficients for the selected victim line and one determined disturber line combination.

According to an example embodiment, the list indicates the first vectoring coefficients for the selected victim line and the one determined disturber line combination across all tones.

According to an example embodiment, the controller is configured to assign the victim line and disturber line combinations such that groups of disturber lines assigned to vectoring processors associated with a first victim line and groups of disturber lines assigned to vectoring processors associated with a second victim line are the same.

According to an example embodiment, the controller is configured to assign the victim line and disturber line combinations such that groups of disturber lines assigned to vectoring processors associated with a first victim line and groups of disturber lines assigned to vectoring processors associated with a second victim line are different.

According to an example embodiment, the system includes first and second victim lines, first and second vectoring processors are associated with the first and second victim lines, respectively, and the controller is configured to assign a first group of disturber lines to the first and second vectoring processors.

According to an example embodiment a method includes storing vectoring coefficients corresponding to different victim line and disturber line combinations of a plurality of communication paths connected to a plurality of ports, at least one victim line associated with two of the plurality of vectoring processors and assigning the victim line and disturber line combinations to memories of a plurality of vectoring processors based on loads associated with the vectoring coefficients.

According to an example embodiment, the method further includes reassigning a selected victim line and disturber line combination assigned to a selected vectoring processor to another vectoring processor of the plurality of vectoring processors based on the loads.

According to an example embodiment, the method further includes selecting a victim line of the plurality of communication paths, determining disturber lines of the selected victim line, obtaining first vectoring coefficients associated with the selected victim line and the determined disturber lines, the first vectoring coefficients being a portion of the vectoring coefficients corresponding to the selected victim line and determined disturber line combinations of the plurality of communication paths and first assigning the determined disturber lines of the selected victim line to one of the plurality of vectoring processors based on the first vectoring coefficients.

According to an example embodiment, the assigning reassigns at least one of the determined disturber lines of the selected victim line to another of the plurality of vectoring processors based on a total load of the first assigned vectoring processor.

According to an example embodiment, the first vectoring coefficients are associated with first loads, respectively, the first loads being a portion of the loads associated with the vectoring coefficients and the total load is a sum of the first loads.

According to an example embodiment, the total load corresponds to a number of bits, the number of bits being the number of bits used to represent a list of the first vectoring coefficients when stored in the memory of the first assigned vectoring processor, the list indicating the first vectoring coefficients for the selected victim line and one determined disturber line combination.

According to an example embodiment, the assigning assigns the victim line and disturber line combinations such that groups of disturber lines assigned to vectoring processors associated with a first victim line and groups of disturber lines assigned to vectoring processors associated with a second victim line are the same.

According to an example embodiment, the assigning assigns the victim line and disturber line combinations such that groups of disturber lines assigned to vectoring processors associated with a first victim line and groups of disturber lines assigned to vectoring processors associated with a second victim line are different.

According to an example embodiment, first and second vectoring processors are associated with first and second victim lines, respectively, and the assigning assigns a first group of disturber lines to the first and second vectoring processors.

BRIEF DESCRIPTION OF THE DRAWINGS

Example embodiments will be more clearly understood from the following detailed description taken in conjunction with the accompanying drawings.

FIG. 1 illustrates communication system, according to an example embodiment;

FIG. 2 illustrates a controller including a plurality of vectoring processors, according to an example embodiment;

FIG. 3 illustrates a method of load balancing according to an example embodiment;

FIG. 4 illustrates a controller including a plurality of vectoring processors, according to an example embodiment; and FIG. 5 illustrates a method of load balancing according to an example embodiment.

DETAILED DESCRIPTION

Figure 1:
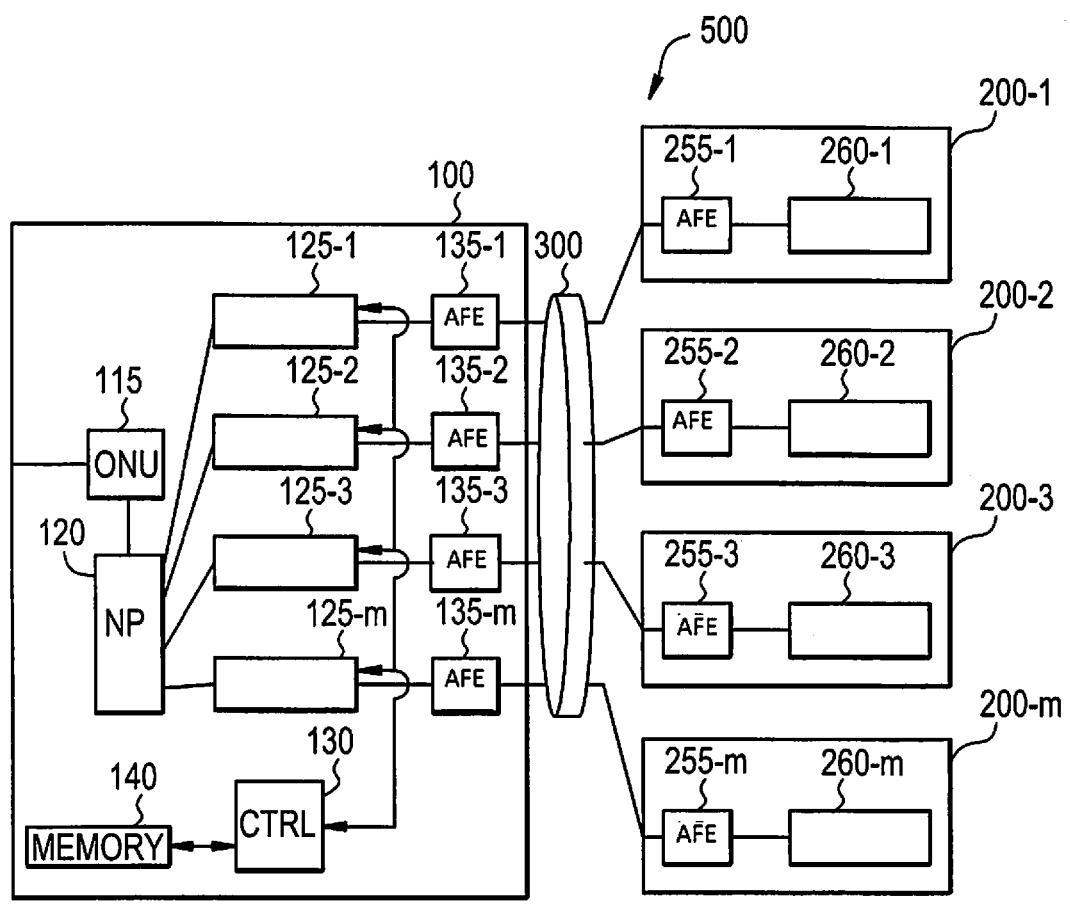
FIGS. 1-5 represent non-limiting, example embodiments as described herein.

Various example embodiments will now be described more fully with reference to the accompanying drawings in which some example embodiments are illustrated.

Accordingly, while example embodiments are capable of various modifications and alternative forms, embodiments thereof are shown by way of example in the drawings and will herein be described in detail. It should be understood, however, that there is no intent to limit example embodiments to the particular forms disclosed, but on the contrary, example embodiments are to cover all modifications, equivalents, and alternatives falling within the scope of the claims. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Portions of example embodiments and corresponding detailed description are presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

In the following description, illustrative embodiments will be described with reference to acts and symbolic representations of operations (e.g., in the form of flowcharts) that may be implemented as program modules or functional processes including routines, programs, objects, components, data structures, etc., that perform particular tasks or implement particular abstract data types and may be implemented using existing hardware at existing network elements or control nodes. Such existing hardware may include one or more Central Processing Units (CPUs), digital signal processors (DSPs), application-specific-integrated-circuits, field programmable gate arrays (FPGAs) computers, system-on-chip (SoC) or the like.

Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of example embodiments are typically encoded on some form of tangible (or recording) storage medium. The tangible storage medium may be magnetic (e.g., a floppy disk or a hard drive), optical (e.g., a compact disk read only memory, or "CD ROM"), and may be read-only memory (ROM), random access memory (RAM), flash memory (e.g., USB flash drives, memory cards, memory sticks, etc.), for example. The terms "tangible storage medium" and "memory" may be used interchangeably. Example embodiments are not limited by these aspects of any given implementation.

FIG. 1 illustrates a communication system, according to an example embodiment. As shown in FIG. 1, a system 500 includes a distribution point or access node 100 and Customer Premises Equipment (CPEs) 200-1 to 200-m, where m may be an integer greater than 1.

The access node 100 may be under control of an operator. The access node 100 includes an optical network unit (ONU) 115 configured to communicate with a network processor (NP) 120. As is known, the ONU 115 provides a high-bandwidth data connection over a fiber optic channel to an optical line terminal (OLT) located in a central office. The ONU 115 passes received downstream data frames or packets to the NP 120, which then determines the destination for the frames or packets and accordingly forwards them to an appropriate interface (e.g., DSL, ADSL, G.fast, VDSL2, etc. interface). Similarly, in the upstream direction, the NP 120 forwards frames or packets from the interfaces to the ONU 115.

The NP 120 provides signals to processing devices 125-1 to 125-m. The processing devices 125 are configured for point-to-point communication.

The access node 100 further includes a controller 130. The controller 130 is configured to receive signal data collectively referred to as a signal vector from the processing devices 125. The signal data may include signal values intended to be received by corresponding processing devices 260-1 to 260-m in the CPEs 200. In the downstream direction, the controller 130 is also configured to precode the signal vector, and send the resulting data back to the processing devices 125 for transmission to the CPEs 200. The processing devices 125 then send the precoded signal data over respective lines 300 via respective analog front ends (AFEs) 135-1 to 135-m.

In the upstream direction, the processing devices 125 receive crosstalk-contaminated signals from the AFEs 135. The controller 130 receives the crosstalk-contaminated signals (collectively referred to as received signal vector) from the processing devices 125, postcodes the received signal vector, and provides the processing devices 125 with the postcompensated signal data. The processing devices 125 then continue to process the signal data to demodulate the intended upstream information.

Generally, the data exchanged between processing devices would be frequency-domain samples, but alternatively the data could be represented as time-domain samples, for example.

As discussed above, the controller 130 communicates with the processing devices 125. Alternatively, the controller 130 may be between the processing devices 125 and the AFEs 135-1 to 135-m. Thus, the location of the controller 130 is not limited to the location shown in FIG. 1.

Furthermore, it will be understood that the access node 100 may include a memory 140, or multiple memories. The NP 120, the controller 130, and/or the processing devices 125 execute programs and/or program modules stored on the memory 140 to perform their respective functions and the functions of the access node 100. The memories may be external to and/or internal to the NP 120, the controller 130, and/or the processing devices 125. For the purposes of simplicity of illustration only, only the memory 140 associated with the controller 130 is shown.

As discussed above, each of the processing devices 125 may communicate with a respective one of the CPEs 200 over the communication lines 300 through an associated AFE 135. The lines 300 (also referred to as links) may be telephone lines (e.g., twisted copper pairs), and the CPEs 200-1 to 200-m may be modems or other interface devices operating according to a communication standard for transmitting data over telephone lines. The CPEs 200-1 to 200-m may be located in various customer premises. Each of the CPEs 200-1 to 200-m includes an AFE 255-1 to 255-m and respective processing devices 260-1 to 260-m. Each of the AFEs 255 may be the same or substantially the same as the AFEs 135.

Conventionally, vectoring is implemented using vectoring processor modules (VPMs).

A VPM is responsible for computations involving the coefficients of one row of the vectoring matrix (i.e., one victim) and a subset of the columns of the vectoring matrix (i.e., a subset of disturbers D).

The VPM contains a memory module that stores coefficients for each of the subset of disturbers D for each of T tones in a compressed format. A decompression circuit converts the compressed coefficients to format to be used and a multiply-accumulate module multiplies the coefficients by tone data values of the disturbers, respectively, and accumulates the result over multiple disturbers. This process is repeated for each of the T tones, in sequence.

To minimize the complexity of the decompression circuit and multiply-accumulate modules, it is beneficial for the number of disturbers D to be small. This also facilitates flexible use of the VPMs in many different use cases with different matrix sizes.

On the other hand, to minimize the total size of all the memory modules, it is more efficient to have a small number of VPMs each containing the coefficients for a large number of disturbers. This is because in practice, different disturbers may require very different amounts of memory in compressed form. In particular, disturbers with strong crosstalk into a victim tend to require larger amounts of memory.

When the number of disturbers handled by a single VPM is large, there is an averaging effect that reduces the worst case amount of memory required per disturber. This is because, in practice, the physical design of the copper cables limits the number of disturbers that can provide very high crosstalk into a given victim.

If the number of disturbers D stored in the memory is small, then it is possible that all of the disturbers assigned to a particular VPM memory module will be strong crosstalkers requiring large amounts of memory. In this case, the memory uses a high memory level per disturber.

Choosing of the number of disturbers D to be allocated to each VPM involves a tradeoff between the size of the memory and the size of the remaining VPM elements. Thus, the inventors have discovered methods and systems for balancing loads across the VPMs in a system. With these methods and systems, it is possible to improve the tradeoff, reducing the number of disturbers D assigned to each VPM, while still keeping the total memory requirements relatively small.

Conventionally, the assignment of disturbers to VPMs is done in a static way that is not under direct control of the vectoring system. For example, an external operator may assign arbitrary labels 0, 1, 2, . . . , N−1 to lines in a vectoring group, and the vectoring system may then be constructed to always assign disturbers 0, 1, . . . , D−1 to one VPM, disturbers D,D+1, . . . , 2D−1, to another VPM, and so on.

In example embodiments, a vectoring controller controls which disturbers are assigned to which VPM such that the memory "load" experienced by the VPMs becomes more balanced, reducing worst case loads, and allowing the VPM to be designed with lower overall memory and hence cost.

Figure 2:
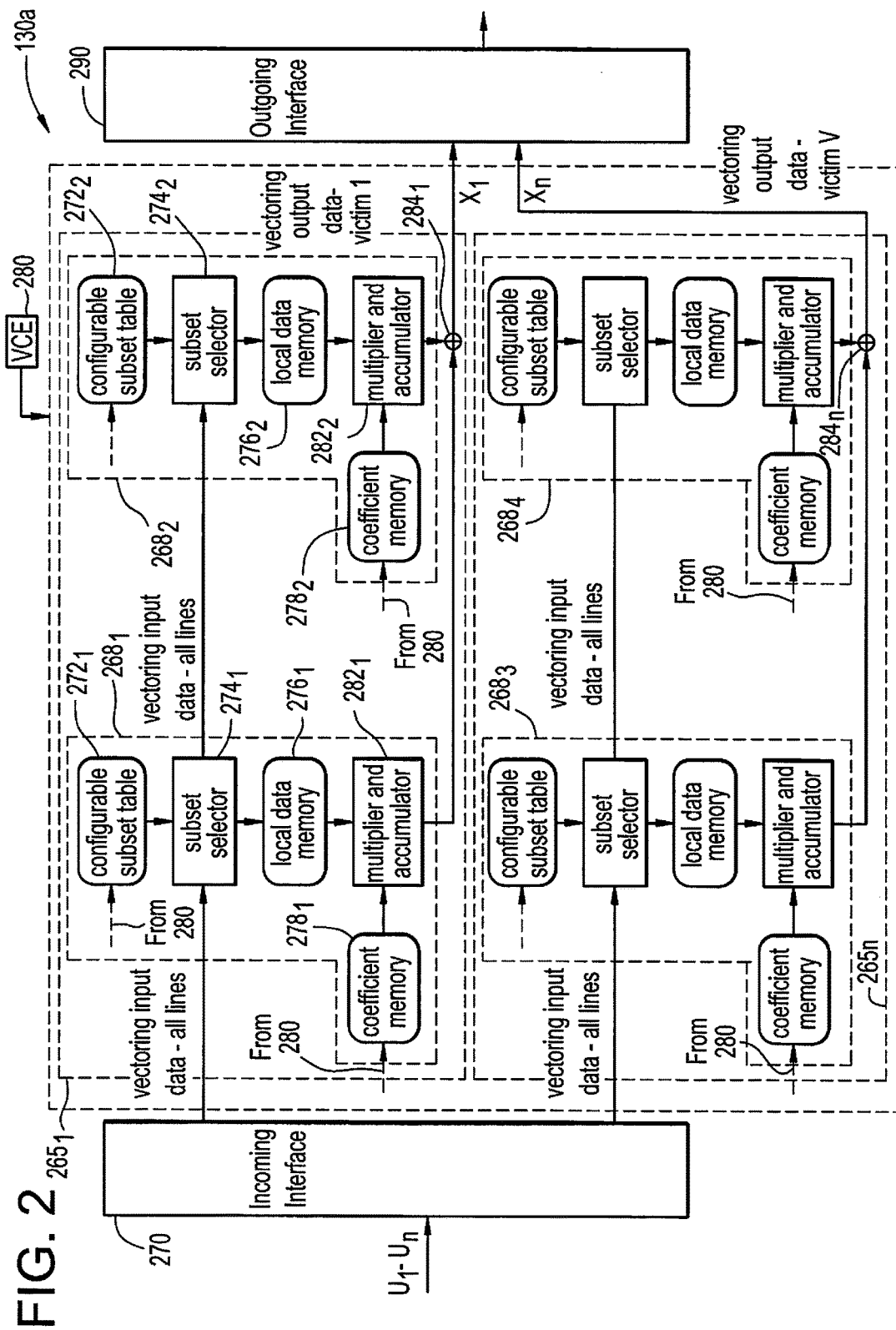

FIG. 2 illustrates an example embodiment of the controller 130 structured to implement a per-victim assignment to VPMs $268_1$-$268_4$. Per-victim assignment refers to groups of disturbers assigned to a same VPM may be different for different victims (rows).

As shown in FIG. 2, a controller 130a includes an incoming interface 270, a vectoring control entity (VCE) 280 and an outgoing interface 290. The controller 130a also includes a plurality of vectoring paths $265_1$-$265_n$ for n victim lines, respectively.

The controller 130 has a communication interface 270 with each of the processing devices 125-1 to 125-m. The incoming communication interface 270 receives data (vectoring input data (e.g. modulated constellation points)) and control signals from the processing devices 125-1 to 125-m. The incoming communication interface 270 forwards symbol data $u_1$-$u_n$ from the respective processing devices 125-1 to 125-m that are to be vectored.

The incoming communication interface 270 forwards the symbol data $u_1$-$u_n$ to the plurality of vectoring paths $265_1$-$265_n$ (i.e. the symbol data $u_1$-$u_n$ goes to $265_1$-$265_n$).

The incoming communication interface 270 may also forward receiver feedback, such as crosstalk characteristics to the vectoring control entity (VCE) 280.

The crosstalk characteristics could be error feedback samples or DFT output samples collected by the receiver (the samples are then processed by correlation etc. to come up with estimates of crosstalk coefficients). Alternatively, the crosstalk characteristics could be estimates of crosstalk coefficients computed elsewhere and then forwarded to the VCE 280. Additionally, the crosstalk characteristics could be other forms of feedback, e.g., SNR measurements that are affected by crosstalk and can be used to learn something about the crosstalk.

In general, the vectoring paths $265_1$-$265_n$ apply coefficients received from the VCE 280 to the symbol data received from the incoming communication interface 270 to produce compensated data symbols $x_1$-$x_n$ (precoded data), which are forwarded to an outgoing communication interface 290. The outgoing communication interface 290 sends the compensated data symbols to the processing devices 125-1 to 125-m, or to a subset of these devices. Additionally, the incoming communication interface 270 periodically receives receiver feedback data, which it forwards to the VCE 280.

Each of the vectoring paths $265_1$-$265_n$ includes a plurality of vectoring processing modules (VPMs). In FIG. 2, the vectoring path $265_1$ includes a VPM $268_1$ and a VPM $268_2$. The vectoring path $265_n$ includes a VPM $268_3$ and a VPM $268_4$.

While each vectoring path $265_1$-$265_n$ is illustrated as including two VPMs, it should be understood that the number of VPMs may be greater than two in each path. Moreover, while each vectoring path $265_1$-$265_n$ may have the same number of VPMs, example embodiments are not limited thereto.

While example embodiments are generally described with one victim associated with each VPM, example embodiments are not limited thereto. Each of $268_1$ through $268_4$ is a different VPM. In an example, a precoder matrix is a 6×6 grid for 6 victims and 6 disturbers. In one example, each VPM is a 1×3 unit that handles 1 victim and 3 disturbers.

Thus, two VPMs cover a single victim (i.e. a 1×6 row of the matrix). Six such pairs of VPMs then cover the entire matrix (all 6 rows). As an alternative, the system may include VPMs that are 2×2, handling two victims and two disturbers. Putting three VPMs together, results in a 2×6 unit covering 2 rows. Thus, three such groups of three VPMs cover all six rows. In FIG. 2, VPMs that cover the same victim (or victims) are arranged horizontally and their outputs are summed together.

Each VPM $268_j$ (where j is between 1 and n) includes a subset table $272_j$, a subset selector $274_j$, a local data memory $276_j$, a coefficient memory $278_j$ and a multiplier and accumulator $282_j$.

The incoming interface 270 distributes the input data $u_1$-$u_n$ to the subset selectors $274_1$-$274_n$.

The subset selector $274_1$ is configured by the configurable subset table $272_j$ to select a subset of not more than C lines of the vectoring input data $u_1$-$u_n$, where C is less than n and is a design parameter. The parameter C is based on empirical data and may be the same as the number D previously mentioned, with associated tradeoffs. As will be described in greater detail below each VPM is assigned a subset of victim-disturber combinations to process. For example, the VPMs $268_1$ and $268_2$ are assigned, by the controller 130a, different subsets of disturbers to process for first victim. Thus, the subset selector $274_1$ selects input data from $u_1$-$u_n$ that corresponds to the subset of disturbers assigned to the VPM $268_1$ and a subset selector $274_2$ selects input data from $u_1$-$u_n$ that corresponds to the subset of disturbers assigned to the VPM $268_2$.

The disturber assignment for $VPM_j$ is stored by the controller 130a in the configurable subset table $272_j$. Thus, the subset selector $274_j$ selects the subset of not more than C lines, where the subset is the disturbers identified in the configurable subset table $272_j$.

In FIG. 2, the subset selector $274_j$ may pass the input data $u_1$-$u_n$ through from left to right to a next subset selector of another VPM (i.e., the subset selector $274_2$ in the instance of the subset selector $274_1$), but in the vertical direction, only pass through the selected input data corresponding to the subset of lines (the disturbers associated with VPM $268_j$) specified in the corresponding configurable subset table $272_j$. The subset selector $274_j$ may select input data corresponding to the subset of lines (the disturbers associated with VPM $268_j$) specified in the corresponding configurable subset table $272_j$ by reading operator-assigned ids of tone-data packets read from the packet and selecting ids that are identified in the corresponding configurable subset table $272_j$.

The selected input data is temporarily stored in local data memory $276_j$.

The multiply-and-accumulator $282_j$ multiplies each selected input data value (tone data value) stored in the local data memory $276_j$ with a corresponding vectoring coefficient stored in the coefficient memory $278_j$. For example, a selected data value for a first disturber line is multiplied by a vectoring coefficient for the first disturber line and for the victim line associated with VPM $268_j$. The overall process is repeated on each tone.

The coefficient memory $278_j$ stores compressed versions of the vectoring coefficients. The compressed versions are decompressed (by a decompressor (not shown)) when used (i.e., when used in vectoring).

The output of the multiply and accumulators on a same vectoring path are summed at an adder of the vectoring path. For example, the output of the multiply and accumulator $282_1$ and the output of the multiply and accumulator $282_2$ are summed to form compensated data symbol $x_1$ for the first victim line across the associated vectoring path $265_1$.

The outgoing communication interface 290 sends the compensated data symbols $x_1$-$x_n$ to the processing devices 125-1 to 125-n, or to a subset of these devices.

The dashed arrows connected to the coefficient memories $278_1$-$278_n$ and the configurable subset tables $272_1$-$272_n$ indicate that the contents of these elements are set by control signals generated by VCE 280 and are not part of the real-time signal processing indicated by solid arrows.

The vectoring control entity (VCE) 280 determines the vectoring coefficients used for each victim and disturber combination/pair. The VCE 280 also performs a load balancing algorithm to divide the disturber lines into n subsets assigned to the VPMs $265_1$-$265_n$, respectively. The VCE 280 then fills in the configurable subset tables $272_1$-$272_n$ and coefficient memories $278_1$-$278_n$ accordingly.

In an example embodiment, the incoming interface 270, the vectoring paths $265_1$-$265_n$ and the outgoing interface 290 are implemented in an ASIC. The coefficient memory $278_j$ and local data memory $276_j$ are localized. Thus, in one example embodiment, coefficient memory $278_j$ and local data memory $276_j$ are not shared amongst the VPMs.

In an example embodiment, the configurable subset tables $272_j$, the subset selectors $274_j$, the multiply and accumulators $276_j$ are implemented in hardware (e.g., an ASIC) and the VCE 280 is implemented in a processor configured to execute software. However, example embodiments are not limited thereto.

For example, each of the incoming communication interface 270, the configurable subset tables 274 the subset selectors $274_j$, the multiply and accumulators $276_j$, the outgoing communication interface 290 and the vectoring control entity 280 may be implemented in hardware, a processor configured to execute software, firmware, or any combination thereof. When at least one of the incoming communication interface 270, the configurable subset tables $272_j$, the subset selectors $274_j$, the multiply and accumulators $276_j$, the outgoing communication interface 290 and the vectoring control entity 280 is hardware, such existing hardware may include one or more Central Processing Units (CPUs), digital signal processors (DSPs), application-specific-integrated-circuits (ASICs), field programmable gate arrays (FPGAs) computers, Systems on Chip (SoCs) or the like configured as special purpose machines to perform the functions of the at least one of the incoming communication interface 270, the configurable subset tables $272_j$, the subset selectors $274_j$, the multiply and accumulators $276_j$, the outgoing communication interface 290 and the vectoring control entity 280. CPUs, DSPs, ASICs, SoCs and FPGAs may generally be referred to as processors and/or microprocessors.

In the event where at least one of the incoming communication interface 270, the configurable subset tables $272_j$, the subset selectors $274_j$, the multiply and accumulators $276_j$, the outgoing communication interface 290, and the vectoring control entity 280 is a processor executing software, the processor is configured as a special purpose machine to execute the software, stored in a storage medium (e.g., memory 140), to perform the functions of the at least one of the incoming communication interface 270, the configurable subset tables $272_j$, the subset selectors $274_j$, the multiply and accumulators $276_j$, the outgoing communication interface 290 and the vectoring control entity 280. In such an embodiment, the processor may include one or more Central Processing Units (CPUs), digital signal processors (DSPs), application-specific-integrated-circuits (ASICs), field programmable gate arrays (FPGAs) computers and SoCs.

Figure 3:
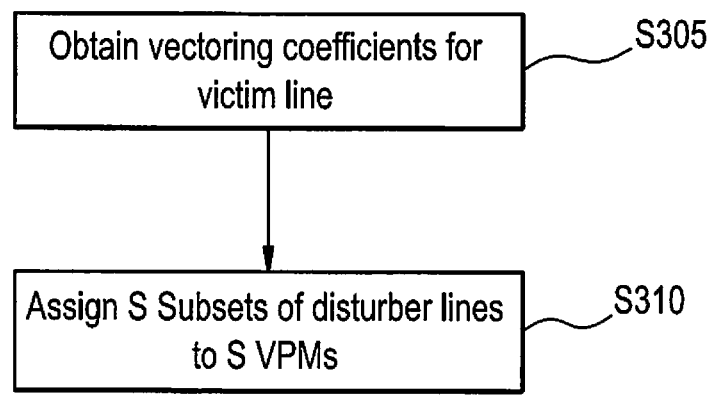

FIG. 3 illustrates a method of load balancing in a per-victim system according to an example embodiment. The method of FIG. 3 may be performed by the VCE 280.

At S305, the VCE 280 obtains vectoring coefficients for a victim line. More specifically, the VCE 280 may determine vectoring coefficients for the victim line using any known method. For example, the VCE 280 may determine the vectoring coefficients in accordance with the pilot-based estimation algorithms supported by G.vector and G.fast. The algorithms are based on sending pilot sequences both upstream and downstream, measuring error signals, forwarding error signals to the VCE 280, and correlating error signals against transmitted pilots.

At S310, the VCE 280 assigns S subsets of the disturber lines to S VPMs in the vectoring path for the victim line. The VCE 280 then configures the subset tables associated with the vectoring path such that the associated subset selector of each VPM accesses vectoring input data for a different subset.

More specifically, the VCE 280 divides the disturber lines into S subsets such that an amount of coefficient memory associated with the heaviest loaded subset is lowered (e.g., minimized).

The VCE 280 may implement an algorithm related to a weighted bin-packing problem. For example, each of the S VPM coefficient memories (e.g., $278_1$-$278_4$) can hold a specified number of items, D, with DS≥N, where N is the number of disturbers. Each of the D items has a load $w_{vd}$ that represents the expected amount of memory required for coefficients for victim v and disturber d. The objective of the algorithm is to reduce (e.g., minimize) the total load of items assigned to the worst-case VPM. In the case of per-victim assignment, there is a different bin-packing problem for each value of v, and these N different bin-packing problems can be solved independently.

In the case of per-victim assignment, the assignments can be made independently for each victim v.

For example, the VCE 280 may implement the following:
1. Given input data are capacity D, number of VPMs per victim S, number of lines N, and the N×N matrix of loads $w_{vd}$. Each load $w_{vd}$ indicates how much memory will be occupied by the list of vectoring coefficients for the victim v and the disturber d over all tones. Outputs are N assignments, $A_1, \ldots, A_N$, where $A_v$ is an assignment of N lines to S groups, for the S VPMs associated with the victim v, with no more than D lines in each group.
2. Choose the victim v, and focus on the N corresponding loads $w_{vd}$.
3. Initially assign all of the N lines to S groups (assignment A), by an arbitrary rule and calculate an objective f(v,A) as the maximum over all groups m, of the total weight of items assigned to that group on the victim v. This amounts to counting all bits that would be stored in each of S VPM coefficient memories associated with the victim v, using the assignment A, and noting the number of bits on the most heavily loaded VPM.
4. Chose the group m* (or one of the groups) that has total weight f(v,A).
5. For each disturber assigned to group m*, and each of the disturbers not assigned to group m*, let A' be the assignment in which these two disturbers trade places. Calculate f(v,A') for each such pair, and choose the pair with the smallest value of f(v,A').
6. If f(v,A') for the best pair is less than f(v,A), implement the change (letting A=A') and repeat from step 3. Otherwise, let $A_v$=A be the output assignment for victim v.
7. Choose another victim line to be the victim v and repeat steps 2-7 until all victims have been chosen.

Moreover, while the example embodiment shown in FIG. 3 is described with reference to an initial assignment, the VCE 280 may reassign disturber lines to different VPMs within a vectoring path for a victim line based on loads that change and/or are added.

Figure 4:
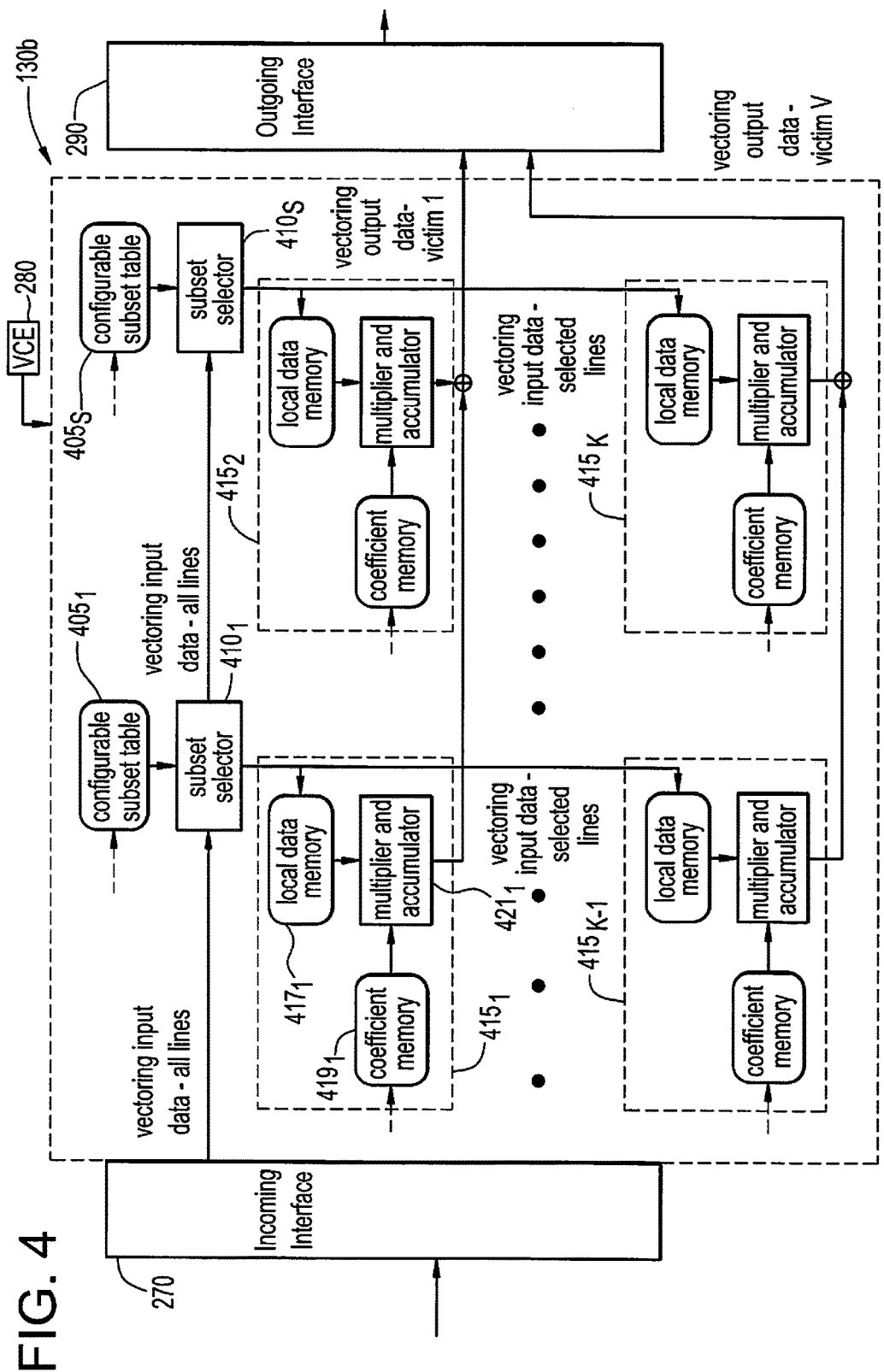

FIG. 4 illustrates an example embodiment of the controller 130 structured to implement a per-system assignment to the VPMs $268_1$-$268_4$. Per-victim assignment refers to a system in which the groups of disturbers assigned to the VPMs associated with one victim may be different from the groups of disturbers assigned to the VPMs associated with another victim. Per-system assignment refers to a system in which the groups of disturbers assigned to VPMs associated with each victim must be the same for all victims.

As shown in FIG. 4, a controller 130b includes the incoming interface 270, the vectoring control entity (VCE) 280 and the outgoing interface 290.

The controller 130b is similar to the controller 130a. Thus, for the sake of brevity, only the differences will be described.

The controller has a plurality of VPMs $415_1$-$415_k$. A string of VPMs (e.g., a row) defines the vectoring path for one of V victim lines. For example, the VPMs $415_1$-$415_2$ define the vectoring path for the first victim line. Each of the VPMs $415_m$ (where m is between 1 and k) includes a local data memory $417_m$, a coefficient memory $419_m$ and a multiplier and accumulator $421_m$.

In contrast to the VPMs $268_1$-$268_n$, the VPMs $415_1$-$415_k$ do not each include a subset table and a subset selector. As stated above, per-system assignment refers to groups of disturbers being the same for all victims. For example, the first VPM of both the first victim and the victim line V process the same group of disturbers.

Thus, instead of one configurable subset table and subset selector associated with each VPM (as shown in FIG. 2), there are only S subset selectors $410_1$-$410_s$ and corresponding configurable subset tables $405_1$-$405_s$. Each subset selector $410_1$-$410_s$ and corresponding configurable subset table $405_1$-$405_s$ is associated with V VPMs with each VPM associated with a different victim line. For example, the VPM $415_1$ and the VPM $415_{k-1}$ axe both associated with the subset selector $410_1$.

The selected tone data coming from a given subset selector is distributed to all V VPMs associated with the given subset selector. For example, the subset selector $410_1$ may pass the input data $u_1$-$u_n$ through from left to right to a next subset selector (i.e., the subset selector $410_s$ in the instance of the subset selector $410_1$), but in the vertical direction, only pass through the selected input data corresponding to the subset of lines (the disturbers associated with a first set of VPMs, with each VPM in the first set being associated with a different victim line/vectoring path) specified in the corresponding configurable subset table $405_1$.

In the per-system assignment, the configurable subset table $405_1$-$405_s$ may be replaced by a label-swapping mechanism that substitutes an operator-assigned id with a system-assigned id. In this implementation, the subset selectors $410_1$-$410_s$ are hard coded so that the subset selector $410_1$ selects data with labels 0, . . . , D−1, and the subset selector $410_s$ selects data with labels (S−1)D, . . . , SD−1. The incoming interface 270 contains a configurable label-swapping table that can be configured by the VCE 280. The label swapping table contains for each operator-assigned label 0 . . . N−1 a system-assigned label. As the incoming interface 270 forwards data, the incoming interface 270 replaces the incoming (operator-assigned) label with a new label indicated in the label-swapping table. The new label then determines which of the subset selectors will choose that data, according to the hard-coded setting of the subset selectors $410_1$-$410_s$.

As an example, if data from the line with operator-assigned label 0 is to be sent to the VPM $415_s$, then the VCE 280 fills in element 0 of the table with one of the labels (S−1)D through SD−1. If data from that line is to be sent to the VPM $415_1$, then element 0 of the table is filled with one of the labels 0 through D−1.

The remaining functionality and structure of the VPMs $415_1$-$415_k$ and the vectoring of the V victim lines is the same as the per-victim controller 130a that is illustrated in FIG. 2.

The disturber lines may be assigned to one of the S groups of subset selectors $410_1$-$410_s$ using the load-balancing method described below in reference to FIG. 5, for example.

Figure 5:
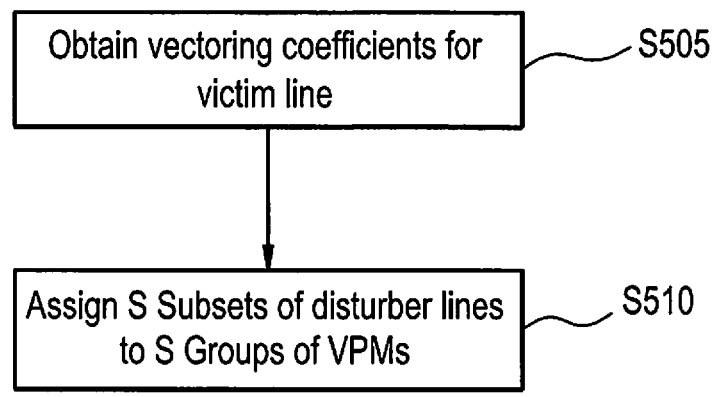

FIG. 5 illustrates a method of load balancing in a per-system system according to an example embodiment. The method of FIG. 5 may be performed by the VCE 280.

At S505, the VCE 280 obtains vectoring coefficients for victim lines in the system. More specifically, the VCE 280 may determine vectoring coefficients for the victim lines using any known method. For example, the VCE 280 may determine the vectoring coefficients in accordance with the pilot-based estimation algorithms supported by G.vector. The algorithms are based on sending pilot sequences both upstream and downstream, measuring error signals, forwarding error signals to the VCE 280, and correlating error signals against transmitted pilots.

At S510, the VCE 280 determines and assigns S subsets of the disturber lines to the subset selectors $410_1$-$410_s$ and corresponding configurable subset tables $405_1$-$405_s$, respectively.

The VCE 280 configures the subset tables $405_1$-$405_s$ such that the corresponding subset selectors $410_1$-$410_s$ access vectoring input data for the assigned subset of disturber lines. In addition, the VCE 280 stores the vectoring coefficients of the subsets of disturber lines in the coefficient memories $419_m$ based on the subset selector to which the subset of disturber lines is assigned. For example, if the VCE 280 determines that one subset of disturbers lines includes lines 2, 3, 4 and 5, the VCE 280 stores the vectoring coefficients corresponding to lines 2, 3, 4 and 5 to all of the coefficient memories $419_m$ that share the subset selector to which the one subset is assigned. For example, the VCE 280 may assign the subset of disturbers lines including lines 2, 3, 4 and 5 to the subset selector $410_1$. The VCE 280 then stores the vectoring coefficients corresponding to lines 2, 3, 4 and 5 to the coefficient memories $419_1$ and $419_{k-1}$.

More specifically, the VCE 280 divides the disturber lines into S subsets such that a heaviest loaded subset (searching over all S subsets on all V victim lines) is reduced (i.e., minimized).

In the case of per-system assignment, the same assignments must be made for all N victims, which correspond to a single bin backing problem with vector-valued loads.

For example, the VCE 280 may implement the following:
1. Given input data are capacity D, number of VPMs per victim S, number of lines N, and the N×N matrix of loads $w_{vd}$. Each load $w_{vd}$ indicates how much memory will be occupied by the list of vectoring coefficients for the victim v and the disturber d over all tones. Output is an assignment A of N lines to S groups, with no more than D lines in each group.
2. Initially assign all of the N lines to S groups (assignment A), and calculate an objective f(A) as the maximum over all victims v and groups m, of the total weight of items assigned to that group on that victim. This amounts to counting all bits that would be stored in each of the VPM coefficient memories using the assignment A, and noting the number of bits on the most heavily loaded VPM.
3. Chose the group m* (or one of the groups) that has total weight f(A).
4. For each disturber in m*, and each of the disturbers not in m*, let A' be the assignment in which these two disturbers trade places. Calculate f(A') for each such pair, and choose the pair with the smallest value of f(A').
5. If f(A') for the best pair is less than f(A), implement the change (letting A=A') and repeat from step 3. Otherwise, halt.

Moreover, while the example embodiment shown in FIG. 5 is described with reference to an initial assignment, the VCE 280 may reassign disturber lines to different VPMs within a vectoring path for a victim line based on loads that change and/or are added.

Various example embodiments can also be distinguished according to when it is possible to modify the assignments of disturbers to VPMs. For example, in some example embodiments the assignment of disturbers to VPMs can be made during showtime, while in other example embodiments the assignment of a disturbers to a VPMs can only be changed when the victim and/or disturber involved is inactive. When a line leaves and joins, the assignment of that line on VPMs of all active lines can be modified to incrementally improve load balancing. If per-victim assignment is implemented, then the assignment of all active line as disturbers, to the VPMs of the joining line, can be fully re-balanced at joining. Full re-optimization of all assignments can be implemented when all lines are inactive, such as during a system reset.

Example embodiments being thus described, it will be obvious that the same may be varied in many ways. Such variations are not to be regarded as a departure from the spirit and scope of example embodiments, and all such modifications as would be obvious to one skilled in the art are intended to be included within the scope of the claims.

The invention claimed is:

1. A system comprising:
    a plurality of ports;
    a plurality of vectoring processors, each of the plurality of vectoring processors having a coefficient memory storing vectoring coefficients corresponding to different victim line and disturber line combinations of a plurality of communication paths connected to the plurality of ports, at least one victim line associated with two of the plurality of vectoring processors; and
    a controller, the controller being configured to assign the vectoring coefficients corresponding to the different victim line and disturber line combinations to the coefficient memories based on loads associated with the vectoring coefficients.

2. The system of claim 1, wherein each of the plurality of vectoring processors includes,
    a subset table configured to identify assigned disturbers of a selected victim line; and
    a subset selector configured to select data corresponding to the assigned disturber lines and the selected victim line, the vectoring processor configured to process the selected data in accordance with the stored vectoring coefficients.

3. The system of claim 1, wherein the controller is configured to reduce an imbalance of the loads by reassigning a selected victim line and disturber line combination assigned to a selected vectoring processor to another vectoring processor of the plurality of vectoring processors based on the loads.

4. The system of claim 1, wherein the controller is configured to,
select a victim line of the plurality of communication paths;
determine disturber lines of the selected victim line;
obtain first vectoring coefficients associated with the selected victim line and the determined disturber lines, the first vectoring coefficients being a portion of the vectoring coefficients corresponding to the selected victim line and determined disturber line combinations of the plurality of communication paths; and
first assign the determined disturber lines of the selected victim line to one of the plurality of vectoring processors based on the first vectoring coefficients.

5. The system of claim 4, wherein the controller is configured to reassign at least one of the determined disturber lines of the selected victim line to another of the plurality of vectoring processors based on a total load of the first assigned vectoring processor.

6. The system of claim 5, wherein
the first vectoring coefficients are associated with first loads, respectively, the first loads being a portion of the loads associated with the vectoring coefficients, and
the total load is a sum of the first loads.

7. The system of claim 6, wherein the total load corresponds to a number of bits, the number of bits being the number of bits used to represent a list of the first vectoring coefficients when stored in the memory of the first assigned vectoring processor, the list indicating the first vectoring coefficients for the selected victim line and one determined disturber line combination.

8. The system of claim 7, wherein the list indicates the first vectoring coefficients for the selected victim line and the one determined disturber line combination across all tones.

9. The system of claim 1, wherein the controller is configured to assign the victim line and disturber line combinations such that groups of disturber lines assigned to vectoring processors associated with a first victim line and groups of disturber lines assigned to vectoring processors associated with a second victim line are the same.

10. The system of claim 1, wherein the controller is configured to assign the victim line and disturber line combinations such that groups of disturber lines assigned to vectoring processors associated with a first victim line and groups of disturber lines assigned to vectoring processors associated with a second victim line are different.

11. The system of claim 1, comprising:
first and second victim lines, wherein first and second vectoring processors are associated with the first and second victim lines, respectively, and the controller is configured to assign a first group of disturber lines to the first and second vectoring processors.

12. A method comprising:
storing vectoring coefficients corresponding to different victim line and disturber line combinations of a plurality of communication paths connected to a plurality of ports, at least one victim line associated with two of a plurality of vectoring processors; and
assigning the vectoring coefficients corresponding to the different victim line and disturber line combinations to memories of the plurality of vectoring processors based on loads associated with the vectoring coefficients.

13. The method of claim 12, further comprising:
reassigning a selected victim line and disturber line combination assigned to a selected vectoring processor to another vectoring processor of the plurality of vectoring processors based on the loads.

14. The method of claim 12, further comprising:
selecting a victim line of the plurality of communication paths;
determining disturber lines of the selected victim line;
obtaining first vectoring coefficients associated with the selected victim line and the determined disturber lines, the first vectoring coefficients being a portion of the vectoring coefficients corresponding to the selected victim line and determined disturber line combinations of the plurality of communication paths; and
first assigning the determined disturber lines of the selected victim line to one of the plurality of vectoring processors based on the first vectoring coefficients.

15. The method of claim 14, wherein the assigning reassigns at least one of the determined disturber lines of the selected victim line to another of the plurality of vectoring processors based on a total load of the first assigned vectoring processor.

16. The method of claim 15, wherein
the first vectoring coefficients are associated with first loads, respectively, the first loads being a portion of the loads associated with the vectoring coefficients, and
the total load is a sum of the first loads.

17. The method of claim 16, wherein the total load corresponds to a number of bits, the number of bits being the number of bits used to represent a list of the first vectoring coefficients when stored in the memory of the first assigned vectoring processor, the list indicating the first vectoring coefficients for the selected victim line and one determined disturber line combination.

18. The method of claim 12, wherein the assigning assigns the victim line and disturber line combinations such that groups of disturber lines assigned to vectoring processors associated with a first victim line and groups of disturber lines assigned to vectoring processors associated with a second victim line are the same.

19. The method of claim 12, wherein the assigning assigns the victim line and disturber line combinations such that groups of disturber lines assigned to vectoring processors associated with a first victim line and groups of disturber lines assigned to vectoring processors associated with a second victim line are different.

20. The method of claim 12, wherein first and second vectoring processors are associated with first and second victim lines, respectively, and the assigning assigns a first group of disturber lines to the first and second vectoring processors.

* * * * *